US012801544B2

(12) United States Patent
Jalasutram et al.

(10) Patent No.: US 12,801,544 B2
(45) Date of Patent: Nov. 17, 2026

(54) INTERLEAVED SCAN ARCHITECTURE FROM CONCURRENT TESTING

(71) Applicant: Google LLC, Mountain View, CA (US)

(72) Inventors: Maheedhar Jalasutram, Bangalore (IN); Rama Sireesha Arisetti, Bangalore (IN); Vasubabu Ravipati, Panathur (IN); Aalhad Deshpande, Bengaluru (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/097,464

(22) Filed: Apr. 1, 2025

(65) Prior Publication Data

US 2025/0321907 A1 Oct. 16, 2025

Related U.S. Application Data

(60) Provisional application No. 63/633,503, filed on Apr. 12, 2024.

(51) Int. Cl.
*G06F 13/20* (2006.01)
*G06F 1/04* (2006.01)

(52) U.S. Cl.
CPC ................ *G06F 13/20* (2013.01); *G06F 1/04* (2013.01); *G06F 2213/40* (2013.01)

(58) Field of Classification Search
CPC ......... G06F 13/20; G06F 1/04; G06F 2213/40
See application file for complete search history.

(56) References Cited

U.S. PATENT DOCUMENTS

| | | | |
|---|---|---|---|
| 5,754,758 A | 5/1998 | Baeg et al. | |
| 7,546,504 B2 | 6/2009 | Riley et al. | |
| 10,739,401 B2 * | 8/2020 | Bhamidipati .. | G01R 31/318371 |

(Continued)

FOREIGN PATENT DOCUMENTS

| | | |
|---|---|---|
| CN | 103913702 A | 7/2014 |
| KR | 20230061154 A | 5/2023 |
| TW | 202209036 A | 3/2022 |

OTHER PUBLICATIONS

"Foreign Office Action", KR Application No. 10-2025-0045168, Dec. 17, 2025, 8 pages.

(Continued)

*Primary Examiner* — Henry Tsai
*Assistant Examiner* — John B Roche
(74) *Attorney, Agent, or Firm* — Colby Nipper PLLC

(57) ABSTRACT

This document describes apparatuses and techniques for an interleaved scan architecture for concurrent testing of integrated circuit (IC) chips. In various aspects, an IC or system-on-chip may include interleaved scan circuitry, IP blocks or functional blocks on independent power rails, block selection logic, and a scan out combiner. The interleaved scan circuitry can receive test signaling that includes a set of test input/outputs (I/Os) at a first clock rate and generate, based on the received test signaling, multiple sets of test I/Os at a second clock rate for distribution to respective ones of the blocks. In some aspects, the second clock rate is lower than the first clock rate, which enables relaxing of timing constraints during testing and avoids usage of costly test-specific timing buffers. As such, the described aspects can reduce chip test time and reduce silicon complexity by avoiding the need for test-specific timing or power circuitry.

20 Claims, 8 Drawing Sheets

(56) References Cited

U.S. PATENT DOCUMENTS

| | | | |
|---|---|---|---|
| 11,947,887 | B1 | 4/2024 | Chakravadhanula et al. |
| 2009/0106710 | A1 | 4/2009 | Teig et al. |
| 2013/0305200 | A1 | 11/2013 | Wang et al. |
| 2017/0234925 | A1* | 8/2017 | Kawoosa ......... G01R 31/31723 714/727 |
| 2018/0031634 | A1* | 2/2018 | Goel .............. G01R 31/318561 |
| 2018/0306862 | A1 | 10/2018 | Qian et al. |
| 2021/0295169 | A1 | 9/2021 | Sikka et al. |

OTHER PUBLICATIONS

Siddhapathak, et al., "Novel Test Point Algorithm for Register-Based Read Only Memory", May 13, 2025, 12 pages.
Yang, et al., "Test Point Insertion Using Functional Flip-Flops to Drive Control Points", Dec. 2009, 10 pages.
"Foreign Office Action", TW Application No. 114113714, Apr. 20, 2026, 8 pages.
Garg, et al., "Detecting Scan Flop State Corruption During a Functional-to-Scandump Mode Transition Using Parallel Seed Initialization and Comparison", Sep. 2, 2026, 11 pages.
Siddhapathak, et al., "Test Point Insertion System for Hard-to-Detect Hierarchies Using Netlist Structural Signature Analysis", Technical Disclosure Commons, https://www.tdcommons.org/dpubs_series/11581, Sep. 2, 2026, 11 pages.

* cited by examiner

INTERLEAVED SCAN ARCHITECTURE FROM CONCURRENT TESTING

CROSS-REFERENCE TO RELATED APPLICATION(S)

This application claims the benefit of U.S. Provisional Patent Application Ser. No. 63/633,503, filed Apr. 12, 2024, the disclosure of which is incorporated by reference herein in its entirety.

BACKGROUND

Chip manufacturers test chips during or after manufacturing to verify operation of the chips and screen out defective parts to ensure that chip customers receive viable integrated circuit (IC) chips. This testing may occur at various fabrication and chip production stages, which may include wafer sort testing, package level testing, system level testing, and the like. As part of the chip design process, design-for-test (DfT) teams often ensure that test interfaces or "hooks" are present in the design to enable this testing and allow for the delivery of test vectors to be applied on the silicon for screening purposes. Time consumed by the testing, or test time, is an important consideration as it translates into test cost, which in turn affects overall chip cost. As chip complexity increases, conventional testing techniques typically result in corresponding increases in overall chip cost due to increased test time for each chip produced.

SUMMARY

This document describes apparatuses and techniques for an interleaved scan architecture for concurrent testing of integrated circuit (IC) chips. In various aspects, an IC or system-on-chip (SoC) may include interleaved scan circuitry, IP blocks or functional blocks on independent power rails, block selection logic, a scan out combiner, and associated circuitry. The interleaved scan circuitry concurrent scan test module can receive test signaling that includes a set of test input/outputs (test I/Os) at a first clock rate and generate, based on the received test signaling, multiple sets of test I/Os at a second clock rate for distribution to respective ones of the IP blocks (e.g., test areas of an IC or SoC). In some aspects, the second clock rate is lower than the first clock rate, which enables relaxing of timing constraints during testing and avoids usage of costly test-specific timing buffers. As such, the concurrent testing enabled with the interleaved scan architecture can reduce chip test time and reduce silicon complexity by avoiding the need for test-specific timing or power circuitry.

In some aspects, a system-on-chip includes power rails configured to provide power to components of the integrated circuit, intellectual property (IP) blocks, and block selection logic configured to select, from the IP blocks, a group of multiple IP blocks that are each coupled to a different one of the power rails. The system-on-chip also includes interleave scan circuitry configured to receive test signaling comprising test input/output (I/Os) at a first clock rate and generate, based on the test signaling, multiple sets of test I/Os at a second clock rate that is lower than the first clock rate. The interleave scan circuitry then distributes each of the multiple sets of the test I/Os over a respective scan-in I/O bus to one of the IP blocks of the group of multiple IP blocks and receives, over respective scan-out I/O buses and based on the multiple sets of test I/Os, result data from the group of multiple IP blocks. The interleave scan circuitry may then combine the result data received from the group of multiple IP blocks and generate result data at the first clock rate.

In other aspects, a method for testing IP blocks of a system-on-chip includes receiving test data via an interface that operates based on double data rate (DDR) clocking and generating, based on the test data, multiple sets of test data bits at single data rate (SDR) clocking. The method then selects a group of IP blocks that are each coupled to an independent power rail and distributes each of the multiple sets of test data bits to an IP block of the group of IP blocks via a respective one of first multiple buses that operate based on the SDR clocking. Based on the multiple sets of test data bits, the method receives multiple sets of result data bits from the group of IP blocks via second multiple buses that operate based on the SDR clocking. The method includes combining the multiple sets of result data bits received from the group of IP blocks to provide combined result data and transmitting the combined result data via the interface that operates based on the DDR clocking.

This Summary is provided to introduce simplified concepts of an interleaved scan architecture for concurrent testing of an IC or SoC, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of an interleaved scan architecture for concurrent testing are described throughout the disclosure with reference to the Drawings. The use of the same reference numbers in different instances in the description and the figures indicates same or similar elements.

DETAILED DESCRIPTION

Figure 1:
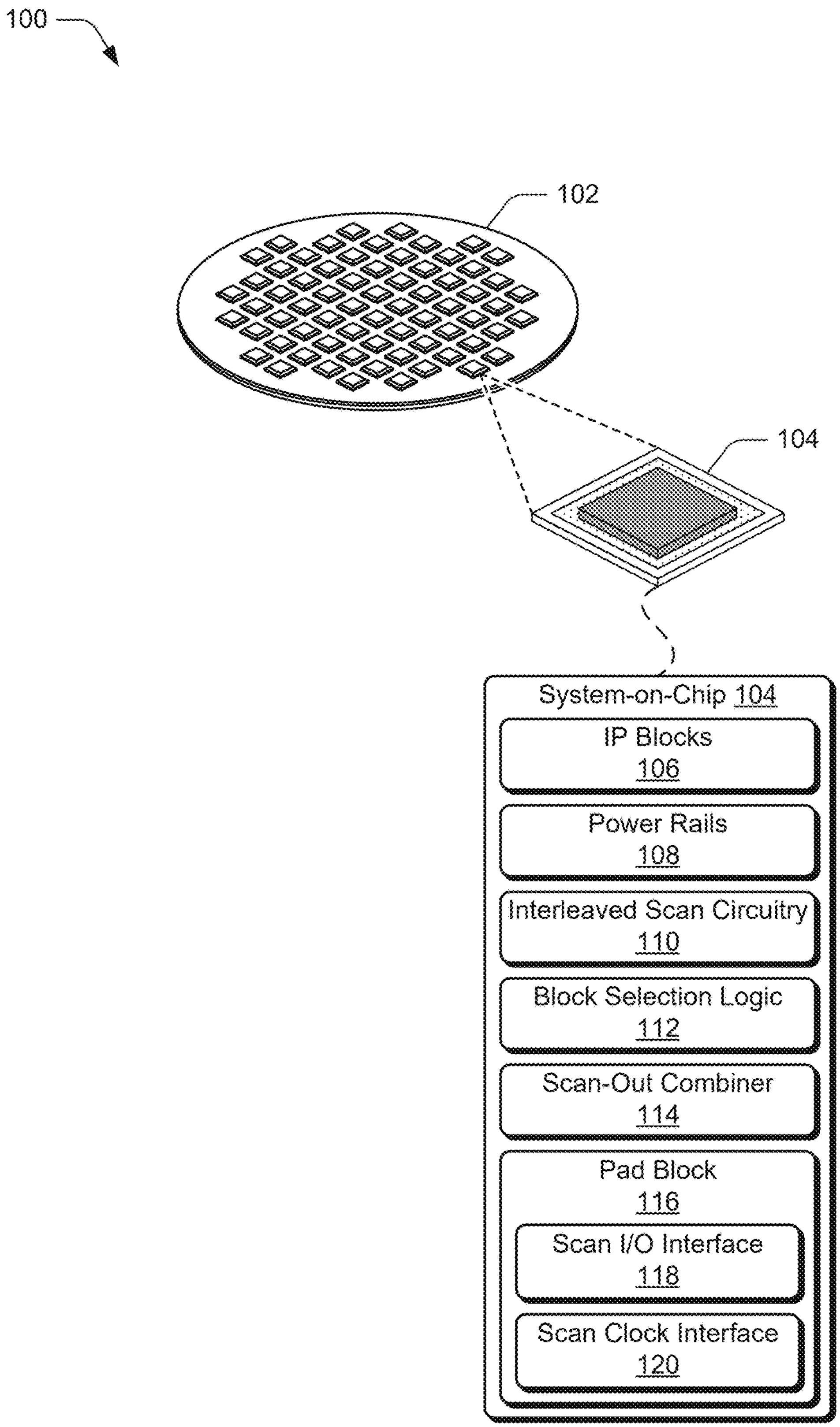
FIG. 1 illustrates an example operating environment in which aspects of an interleaved scan architecture for concurrent testing can be implemented.

Conventional testing techniques often implement testing in a sequential fashion where scan I/Os are applied sequentially to a chain of blocks under test. For example, in a legacy mode, a pad block may operate using a 200 MHz single-data rate clock and 40 I/Os serving a scan network of an entire SoC in sequential fashion. These conventional testing techniques, however, have other issues related to preceding efforts to reduce test time. For example, one method to reduce test time was to increase a scan clock frequency. With a typical scan clock frequency of 100 MHz, increasing the scan clock frequency to 400 MHz could reduce the test time by a factor of four. This approach, however, creates timing closure challenges and many I/O cells do not support such high speeds for low power/low area products, such as mobile processors. In other cases, a number of test I/Os was increased to allow for concurrent testing of more blocks but this approach limits a multi-site configuration of testing, or a number of IC dies that can be concurrently tested at wafer sort or package test stages. In yet other cases, some vendors developed a fast I/O methodology where the scan input data is sampled at double data rate ((DDR), e.g., both edges of the clock), while scan output data is also observed at double data rate clocking. This can provide twice the additional throughput compared to single data rate (SDR) scan clocking. For example, in a legacy mode with a scan clock of 200 MHz SDR and 40 I/Os serving a scan network in sequential fashion, a fast I/O mode in DDR would use a scan clock of 200 MHz DDR by 40 I/Os or the equivalent of 200 MHz by 80 I/Os serving a scan network of an SoC in sequential fashion. While faster, this fast I/O methodology resulted in higher power consumption, increased timing closure complexity, and wider bus routing from the SoC test interface to blocks under test.

In contrast with conventional testing techniques, this disclosure describes aspects of an interleaved scan architecture for concurrent testing. In various aspects, an integrated circuit (IC) or system-on-chip (SoC) may include interleaved scan circuitry, IP blocks or functional blocks on independent power rails, scan out combiner, and associated circuitry. The interleaved scan circuitry can receive test signaling that includes a set of I/Os at a first clock rate and generate, based on the received test signaling, multiple sets of test I/Os at a second clock rate for distribution to respective ones of the IP blocks. In some aspects, the second clock rate is lower than the first clock rate, which enables relaxing of timing constraints during testing and avoids usage of costly test-specific timing buffers (design area left unused in mission mode). As such, the concurrent testing enabled with the interleaved scan architecture can reduce chip test time and reduce silicon complexity by avoiding the need for test-specific timing or power circuitry.

In some aspects, the interleaved scan architecture for concurrent testing can be implemented as a 200 MHZ DDR scan clock by 40 I/Os operated as a 100 MHz SDR scan clock by 160 I/Os feeding custom circuitry to drive four scan networks of 40 I/Os in parallel. Additionally, a subset or each of the scan networks may be attached to an independent power rail or power supply. Generally, these and other aspects of the interleaved scan architecture for concurrent testing offer many advantages or benefits over preceding testing techniques. For example, SoC to IP block scan routing can be reduced as 160 bits or any multiple of the inbound I/Os are distributed across 4 scan networks (e.g., 40 bits per network) or an equivalent number of corresponding scan networks. Additionally, because the scan data is distributed across independent power rails, additional power closure due to scan toggles is not observed. In other words, scan power during testing may be equivalent to mission mode power or regular operating power of the SoC when in use by an end customer. Further, as the scan network can be operated at 100 MHz (compared to legacy 200 MHz), timing closure can be a relaxed effort without sacrificing test time. In many cases, timing buffers to meet 200 MHz clocking constraints can also be avoided, which in turn helps with mission mode leakage (scan paths arc inactive during mission mode). Although the aspects of the interleaved scan architecture for concurrent testing are described with reference to 100 MHz and 200 MHz clocking, it should be appreciated that the described aspects can be implemented with any suitable base frequency and/or number of scan I/Os applied to an SoC with a pad block configured with interleaved scan circuitry to generate any suitable number of corresponding scan networks for testing multiple blocks of the SoC.

With respect to test time, the interleaved scan architecture for concurrent testing may reduce test time for all automated test pattern generation (ATPG) vectors (conventional and advanced). In some cases, this translates into approximately a 30% reduction in test time per chip. Generally, additional timing effort is reduced from I/O to the first DDR scan clock stages, while for the rest of the SoC, the blocks can all work at lower shift frequencies. Another advantage is a reduced amount of scan buffers in reducing the frequency to 100 MHz relative to operating the scan networks at 200 MHz. Further, the SoC design-for-test (DfT) architecture can be modified to select groups of blocks for attachment to different voltage rails, such that additional power closure efforts are not necessary for concurrent testing with the interleaved scan architecture.

In various aspects, an IC or system-on-chip (SoC) may include interleaved scan circuitry, IP blocks or functional blocks on independent power rails, block selection logic, a scan out combiner, and associated circuitry. The interleaved scan circuitry concurrent scan test module can receive test signaling that includes a set of test input/outputs (test I/Os) at a first clock rate and generate, based on the received test signaling, multiple sets of test I/Os at a second clock rate for distribution to respective ones of the IP blocks (e.g., test areas of an IC or SoC). In some aspects, the second clock rate is lower than the first clock rate, which enables relaxing of timing constraints during testing and avoids usage of costly test-specific timing buffers. As such, the concurrent testing enabled with the interleaved scan architecture can reduce chip test time and reduce silicon complexity by avoiding the need for test-specific timing or power circuitry.

This document describes apparatuses and techniques of an interleaved scan architecture for concurrent testing, which may reduce chip test time and reduce silicon complexity by avoiding the need for test-specific timing or power circuitry. The following discussion describes an operating environment, example implementations of various test circuitry and wrappers, and example methods that may be implemented with an interleaved scan architecture. In the context of the present disclosure, reference is made to the operating environment by way of example only.

Example Environment

FIG. 1 illustrates an example environment 100 in which aspects of an interleaved scan architecture for concurrent testing can be implemented in accordance with one or more aspects. In some aspects, a wafer 102 may be fabricated with multiple instances of a system-on-chip 104, integrated circuit, or other type embedded system. As shown in FIG. 1, the wafer 102 includes multiple instances of a system-on-chip 104, which may be configured to enable functionalities of any suitable device. For example, the system-on-chip 104 may be implemented in a smart-phone, a tablet computer, a laptop computer, a gaming console, a desktop computer, a server computer, a wearable computing device (e.g., smartwatch), a broadband router (e.g., mobile hotspot), a mobile station (e.g., fixed-or mobile-STA), a mobile communication device, a user equipment, an entertainment device, a personal media device, a media playback device, a health monitoring device, a drone, a camera, an Internet home appliance capable of wireless Internet access and browsing, an IoT device, and/or other types of electronic devices.

The system-on-chip 104 includes intellectual property (IP) blocks 106, which may include circuitry configured to provide respective functionalities of the system-on-chip 104. The IP blocks 106 may include any suitable type of IP block, functional unit, or module, which may include a central processing unit (CPU), graphics processing unit (GPU), digital signal processor (DSP), memory controller, communication interface, security module, encryption block, network-on-chip, neural network engine, audio codec, power management unit, analog-to-digital converters (ADCs), digital-to-analog converters (DACs), or the like. The system-on-chip 104 may also include power rails 108 through which power is distributed to the IP blocks 106 and circuitry of the system-on-chip 104. Alternatively or additionally, power rails 108 may be referred to as power distribution networks, power planes, or power nets that are configured to distribute or provide power to the IP blocks 106 of the system-on-chip 104. Generally, the power rails 108 may include multiple independent or separate power rails that provide power to different areas or components of the system-on-chip 104.

In aspects, the system-on-chip 104 also includes interleaved scan circuitry 110, block selection logic 112, a scan-out combiner 114, and a pad block 116. Although described separately, any of these elements or components may be implemented in combination with one another. For example, one or more of the block selection logic 112, scan-out combiner 114, and pad block 116 may be implemented as part of the interleaved scan circuitry 110. Thus, the interleaved scan circuitry 110 may include or implement functions described with these and other components of the system-on-chip 104. In various aspects, the interleaved scan circuitry 110 receives test signaling that includes test I/Os at a first clock rate and generates, based on the test signaling, multiple sets of test I/Os at a second clock rate that is different from the first clock rate. The interleaved scan circuitry 110 then distributes each of the multiple sets of the test I/Os over a respective scan-in I/O bus to one of the IP blocks of a group of multiple IP blocks and receives, over respective scan-out I/O buses and based on the multiple sets of test I/Os, multiple sets of result data from the group of multiple IP blocks. In some aspects, the second clock rate is lower than the first clock rate, which enables relaxing of timing constraints during testing and avoids usage of costly test-specific timing buffers (design area left unused in mission mode). As such, the concurrent testing enabled with the interleaved scan circuitry 110 can reduce chip test time and reduce silicon complexity by avoiding the need for test-specific timing or power circuitry.

The block selection logic 112 can select a group or subset of IP blocks to which the test I/Os are applied. For example, IP blocks of a system-on-chip 104 or an integrated circuit may be configured in groups of IP blocks that are each coupled with an independent or separate power rail. In some implementations, a subset of a scan network is routed to multiple IP blocks on a same power rail 108, and each of the multiple IP blocks on the same power rail are organized into different IP block groups. Thus, when a given IP block group is scanned, only one of the IP blocks on the power rail will be tested, along with the other IP blocks in the IP block group that are on different power rails. In aspects, the scan-out combiner can combine multiple sets of result I/Os or result data bits received from a group of IP blocks to provide combined result data. In some implementations, the scan-out combiner 114 receives the multiple sets of result I/Os or result data bits at a first data rate (e.g., 100 MHz SDR), combines the result I/Os or result data bits, and transmits the combined result data at a second data rate (e.g. 200 MHz DDR). The scan-out combiner 114 may be implemented with any suitable circuitry or logic, such as shift registers coupled to scan-out I/O buses that are configured to provide combined result data.

In aspects, the pad block 116 includes various I/O interfaces, clock interfaces, and associated circuitry for receiving test signaling from a test host and transmitting result data back to the test host. For example, the pad block 116 may include an I/O interface configured to communicate test data and/or result data over a data bus with a predefined bit-width, operating frequency, and/or clocking mode (e.g., SDR, DDR). Alternatively or additionally, the pad block 116 may include a clock interface configured to receive and/or redistribute a scan clock signal with a predefined frequency and/or clocking mode (e.g., SDR, DDR). In some implementations, the interleaved scan circuitry 110 is coupled between the pad block 116 and the IP blocks 106, and may include scan networks to apply data to the IP blocks and receive result data back from the IP blocks.

Figure 2:
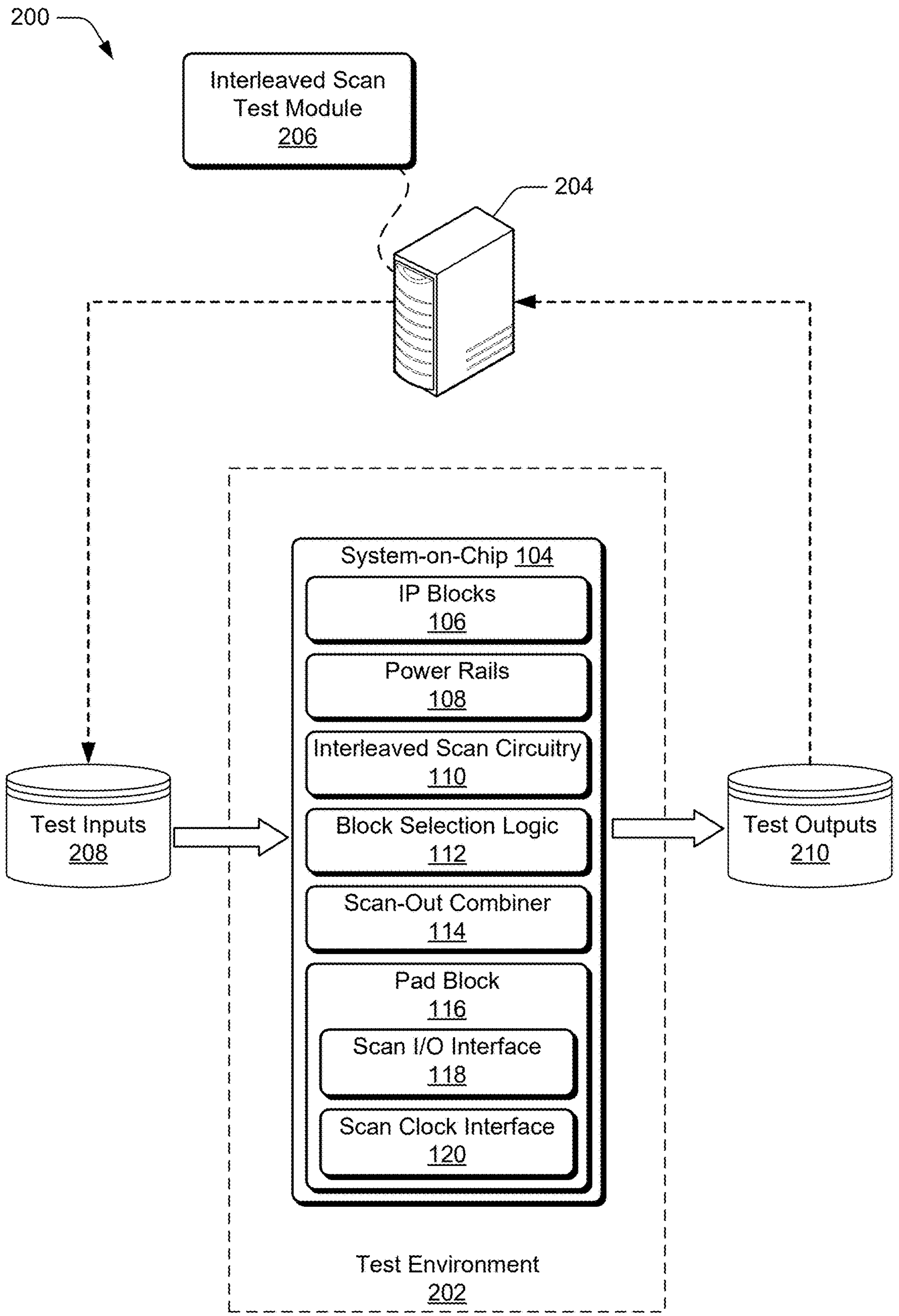
FIG. 2 illustrates example testing environment in which an interleaved scan architecture can implement aspects of concurrent testing in accordance with one or more aspects.

FIG. 2 illustrates at 200 an example testing environment in which an interleaved scan architecture can implement concurrent testing of IP blocks in accordance with one or more aspects. The test environment 202 may include any suitable environment or access mode (e.g., test mode, validation mode, scan mode) in which a test host 204 and/or interleaved scan test module 206 applies test inputs 208 to the system-on-chip 104 to obtain test outputs 210, which can be compared to expected responses to evaluate respective operation or function of the IP blocks 106 or other circuitry of the system-on-chip 104. In aspects, the test host 204 applies various test tools, such as ATPG vectors, to generate the test inputs 208 (e.g., test I/Os, test data bits) applied to the system-on-chip 104. Generally, the test inputs 208 may include any suitable type of data, data bits, patterns, address information, controls signals, settings, or the like. Based on the test inputs 208, the test host 204 can obtain or capture the test outputs 210 at respective outputs of the pad block 116 and/or from other status or output indicators of the system-on-chip 104. The test outputs or results may include any suitable type of data or signaling, which may include signaling, data bits (e.g., result data bits), patterns, I/Os (e.g., scan-out I/Os), or the like.

In some aspects, the interleaved scan test module 206 configures the components of the system-on-chip 104 for concurrent testing with the interleaved scan architecture. For example, during design of the system-on-chip 104, the interleaved scan test module 206 can identify IP blocks or functional blocks of the system-on-chip 104 that are coupled with independent or different respective power rails. The interleaved scan test module 206 can then route separate scan networks or portions of a scan network to the IP blocks coupled with the different respective power rails. In some cases, independent scan networks are routed to multiple IP blocks that are coupled to a same power rail, such that each block on the same power rail can be tested as part of an IP block group of IP blocks on different power rails. Alternatively or additionally, the interleaved scan test module can assign the IP blocks coupled with the different respective power rails to a block group for concurrent testing. The interleaved scan test module may repeat the assignment process to organize multiple groups of IP blocks in which each IP block is on a different power from other IP blocks of the group.

Figure 3:
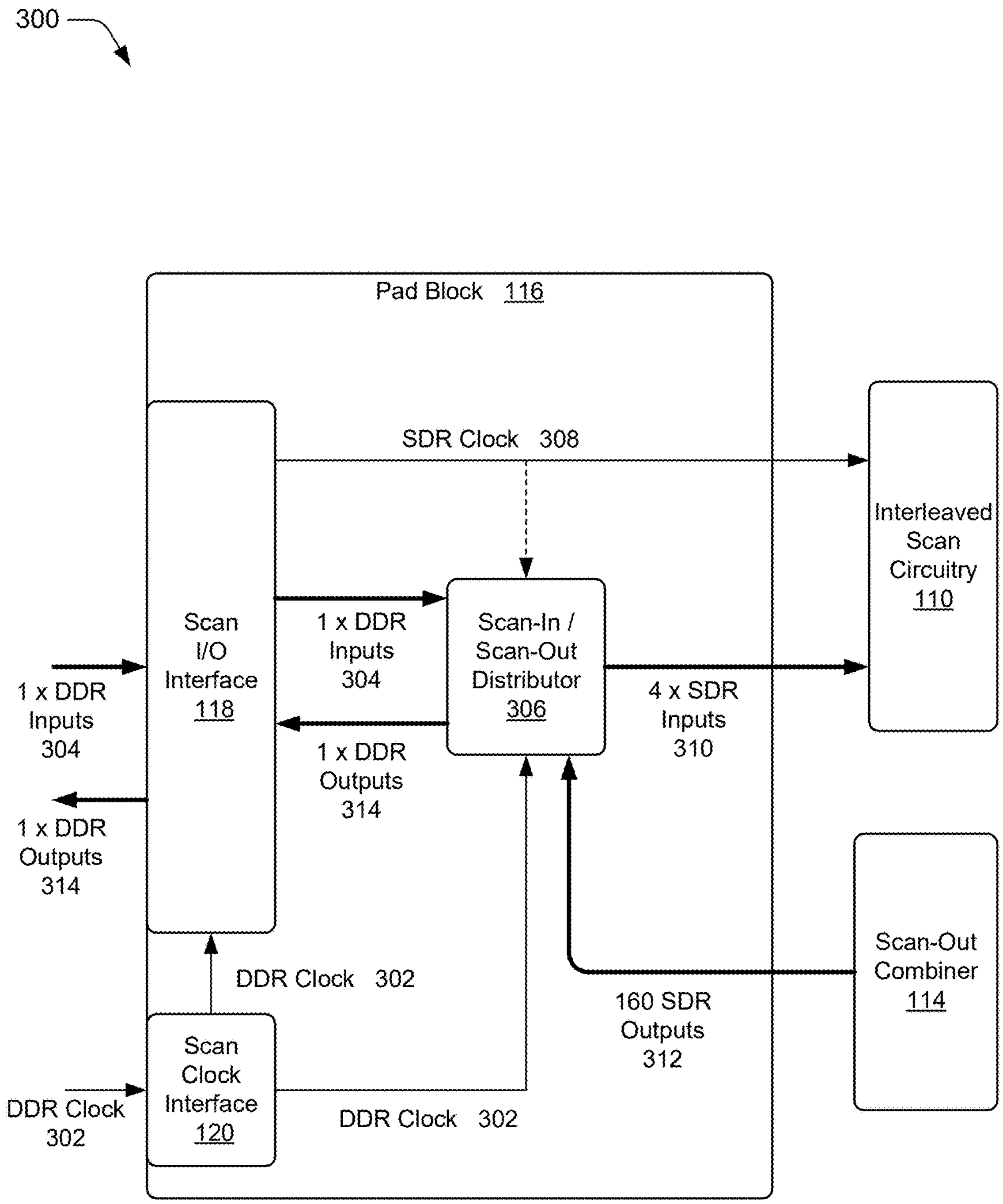
FIG. 3 illustrates an example configuration of a pad block of a system-on-chip implemented in accordance with one or more aspects.

FIG. 3 illustrates at 300 an example configuration of a pad block of a system-on-chip implemented in accordance with one or more aspects. Although described in the context of a pad block of a system-on-chip, the circuitry or components described with reference to the pad block 116 may be implemented with any suitable integrated circuit, embedded system, or test apparatus. The pad block 116 may be embodied on, as part of, or coupled with a system-on-chip to enable testing or access to IP blocks of the system-on-chip. In various aspects, the pad block 116 may include circuitry or components to receive data signaling and clocking from a source of test signals for distribution to the IP blocks of the system-on-chip via interleaved scan circuitry 110 and/or associated components as described herein. Alternatively or additionally, the pad block 116 may include circuitry or components (not shown) to receive and/or collect result signaling or data from the IP blocks of the system-on-chip. The pad block 116 may transmit the result signaling or data to an upstream or destination (e.g., test apparatus, test system) of the result signaling or data (e.g., result data bits).

In this example, the pad block 116 includes instances of a scan I/O interface 118, a scan clock interface 120, and a scan-in/scan-out distributor 306, which may be implemented as a module, block, and/or circuitry for processing or distributing test inputs, signaling, or I/Os. In various aspects, the scan I/O interface 118 receives test I/Os from a source of test signaling and the scan clock interface receives a clock signal by which to sample the I/Os. For example, the scan clock interface 120 can receive a double data rate clock 302 (DDR clock 302) and the scan I/O interface 118 can receive a number or bus-width of DDR inputs 304 (e.g., 40 scan I/Os at 200 MHz DDR), which the scan I/O interface 118 can sample or clock-in based on the DDR clock 302. The scan clock interface can also relay or distribute the DDR clock 302 to the scan-in/scan-out distributor 306 or other portions of the interleaved scan circuitry 110. In aspects, the scan I/O interface transmits or sends the DDR inputs 304 to the scan-in/scan-out distributor 306 for processing and/or distribution to the IP blocks 106 via the interleaved scan circuitry 110. In some implementations, the scan I/O interface can receive the DDR inputs 304 by sampling the data bits of the I/Os using the DDR clock 302 received from the scan clock interface 120. Alternatively or additionally, the scan I/O interface 118, scan-in/scan-out distributor 306, or interleaved scan circuitry 110 can generate a single data rate clock 308 (SDR clock 308) or lower frequency clock based on the DDR clock 302. The SDR clock 308 can be distributed to the interleave scan circuitry 110, the scan-in/scan-out distributor 306, or other circuitry of the system-on-chip 104.

Figure 4:
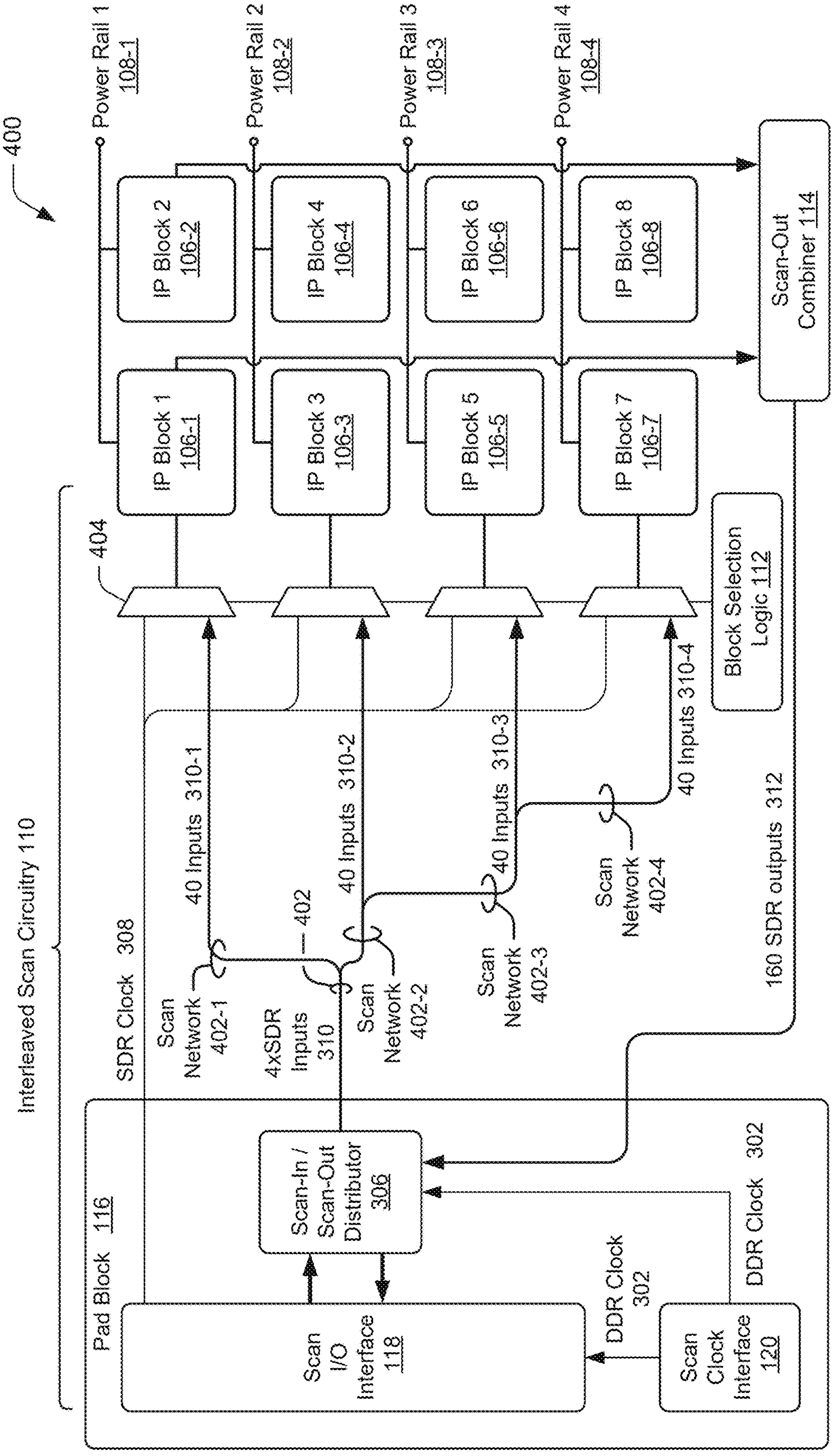
FIG. 4 illustrates an example configuration of an interleaved scan architecture implemented in accordance with one or more aspects.

Based on the received DDR inputs 302, the scan-in/scan-out distributor 306 can generate I/Os or data bits at different or lower clock rates for distribution over the interleaved scan circuitry 110. In this example, based on the DDR inputs 302 and the SDR clock 308, the scan-in/scan-out distributor 306 generates four sets of SDR inputs 310 (e.g., test I/Os, scan inputs), which may include four subsets of a smaller number or narrower bus-width inputs or I/Os at a lower clock rate (e.g., 4×40 scan inputs or I/Os at 100 MHz SDR). Alternatively or additionally, a subset or each of the scan networks of the interleaved scan circuitry 110 may be attached to an independent power rail or power supply. For example, pad block 116 to IP block 106 scan routing of the interleaved scan circuitry 110 can be reduced as 160 bits or any multiple of the inbound I/Os are distributed across 4 scan networks (e.g., 40 bits/inputs per network) or an equivalent number of corresponding scan networks. Although described with reference to specific bit numbers, bus-widths, clock frequency, or clock modes (e.g., SDR), the scan-in/scan-out distributor 306 can generate any suitable number of I/Os or test bits for distribution through the interleaved scan circuitry 110 at various clock frequencies (e.g., 100 to 400 MHz). Based on the scan inputs, the block under test generates outputs, which the scan-out combiner 114 can receive via respective scan out networks from the blocks under test. As shown in FIG. 4, the scan-out combiner 114 can receive four sets of 40 SDR outputs (not shown) and combine those outputs into 160 SDR outputs as 160 SDR outputs 312, which are transmitted to the scan-in/scan-out distributor 306. In aspects, the scan-in/scan-out distributor 306 converts the 160 SDR outputs 312 to one set of DDR outputs 314 (e.g., 40 scan outputs at 200 MHz DDR) for transmission through the scan I/O interface 118 to any suitable recipient (e.g., test apparatus or test data recipient).

FIG. 4 illustrates at 400 example configuration of an interleaved scan architecture implemented in accordance with one or more aspects. In various aspects, the interleaved scan architecture includes interleaved scan circuitry 110 configured to generate and distribute test signaling (e.g., test I/Os) to multiple scan networks routed to respective IP blocks 106, which may be on a same power rail 108 (e.g., IP block 1 106-1 and IP block 2 106-2). Further, IP blocks 106 on different or independent power rails 108 can be grouped at IP block groups or selected for concurrent testing when the interleaved scan circuitry 110 applies test inputs (e.g., SDR inputs 310) to the IP blocks via the scan networks 402. Thus, the interleaved scan circuitry 110 can distribute, via respective scan networks 402 or scan-in I/O buses, multiple sets of test inputs (e.g., I/Os or bits) concurrently to the group of multiple IP blocks 106 that each operate from different power rails 108. Note that the testing can be performed in parallel to the group of multiple IP blocks 106 such that each of the multiple sets of the SDR inputs 310-1 through 310-4 is distributed to only one IP block of the group.

As shown in FIG. 4, scan networks 402 of the interleaved scan circuitry 110 receive test signaling that includes SDR inputs 310 (e.g., 160 test inputs or I/Os) generated by the scan-in/scan-out distributor 306 of the pad block 116. In aspects, the interleaved scan circuitry 110 then distributes each of the multiple sets of the SDR inputs 310-1 through 310-4 (e.g., 4×40 test inputs or bits) over a respective scan network 402-1 through 402-4 to a group of the IP blocks 106. In aspects, IP blocks 106 on different or independent power rails 108 can be selected or assigned as groups of IP blocks for testing. In this example, a first group of IP blocks on different power rails includes IP block 1 106-1, IP block 3 106-3, IP block 5 106-5, and IP block 7 106-7 and a second block of IP blocks that includes IP block 2 106-2, IP block 4 106-4, IP block 6 106-6, and IP block 8 106-8. Note that each of the IP block groups includes only one IP block coupled with or that operates from one of the power rails 108-1 through 108-4. In this example, the interleave scan circuitry 110 includes gating logic 404 coupled between the scan networks 402 and the IP blocks of a group of IP blocks to selectively control application of SDR inputs 310 to the IP blocks. The gating logic 404 may include any suitable logic or circuitry, such as multiplexors, pass elements, flip-flops, logic gates, registers, or the like. Although shown in the context of the first group of IP blocks 106, each group of IP blocks may be coupled with respective gating logic 404 to enable the block selection logic 112 to selectively apply test inputs or I/Os to the IP blocks of a given IP block group. In other words, the block selection logic 112 can select a group or subset of IP blocks 106 to which the test inputs 310 are applied.

Based on the SDR inputs 310 applied to each block of the group of IP blocks, the IP blocks provide SDR outputs 312 or scan-out bits to the scan-out combiner 114 of the interleaved scan circuitry. In aspects, the scan-out combiner 114 can combine multiple sets of result outputs or result data bits received from the group of IP blocks to provide combined result data (e.g., 160 SDR outputs 312). In some implementations, the scan-out combiner 114 receives the multiple sets of result I/Os or result data bits at a first data rate (e.g., 160 bits at 100 MHz SDR), combines the result I/Os or result data bits, and transmits the combined result data to the scan-in/scan-out distributor 306 for upclocking and/or transmission at a second data rate (e.g. 40 bits at 200 MHZ DDR). In aspects, the functionality of the scan-out combiner 114 may be implemented separately or combined with the pad block 116. The scan-out combiner 114 and/or the scan-in/scan-out distributor 306 can be implemented with any suitable circuitry or logic, such as shift registers coupled to scan-out I/O buses that are configured to provide combined result data. In this example, the scan-out combiner 114 transmits or sends the combined result I/Os or result data back to the scan-in/scan-out distributor 306 of the pad block 116, which may then relay or transmit the result I/Os or result data to the test apparatus or other test data destination.

As shown in FIG. 4, the interleaved scan circuitry 110 can be implemented as a 200 MHZ DDR scan clock by 40 inputs operated as a 100 MHz SDR scan clock by 160 inputs to drive four scan networks 402 in parallel. Additionally, similar to the IP blocks, a subset or each of these scan networks may be attached to an independent power rail or power supply. Generally, these and other aspects of the interleaved scan architecture for concurrent testing offer many advantages or benefits over preceding testing techniques. For example, SoC to IP block scan routing can be reduced as 160 bits or any multiple of the inbound inputs or I/Os are distributed across 4 scan networks (e.g., 40 bits or I/Os per network) or an equivalent number of corresponding scan networks. Additionally, because the scan data is distributed across independent power rails, additional power closure due to scan toggles is not observed. In other words, scan power during testing may be equivalent to mission mode power or regular operating power of the SoC when in use by an end customer.

Further, as the scan network can be operated at 100 MHz (compared to legacy 200 MHz), timing closure can be a relaxed effort without sacrificing test time. In many cases, timing buffers to meet 200 MHz clocking constraints can also be avoided, which in turn helps with mission mode leakage (scan paths are inactive during mission mode). With respect to test time, the interleaved scan architecture for concurrent testing may reduce test time for all automated test pattern generation (ATPG) vectors (conventional and advanced). In some cases, this translates into approximately a 30% reduction in test time per chip. Generally, additional timing effort is limited from I/O to the first DDR scan clock stages, while for the rest of the SoC, the blocks can all work at lower shift frequencies. Another advantage is a reduced amount of scan buffers in reducing the frequency to 100 MHz relative to operating the scan networks at 200 MHz. Further, the SoC DfT architecture can be modified to select groups of blocks for attachment to different voltage rails, such that additional power closure efforts are not necessary for concurrent testing with the interleaved scan architecture.

Example Methods

Example methods 500 through 700 are described with reference to FIGS. 5-7 in accordance with one or more aspects of an interleaved scan architecture for concurrent testing. Generally, the methods 500 through 700 illustrate sets of operations (or acts) performed in, but not necessarily limited to, the order or combinations in which the operations are shown herein. Further, any of one or more of the operations may be repeated, combined, reorganized, omitted, or linked to provide a variety of additional and/or alternate methods. In portions of the following discussion, reference may be made to example environments of FIGS. 1 and 2, and/or entities described with reference to FIGS. 3 and 4, reference to which is made for example only. The techniques and apparatuses described in this disclosure are not limited to embodiment or performance by one entity or multiple entities operating in relation to an interleaved scan architecture.

Figure 5:
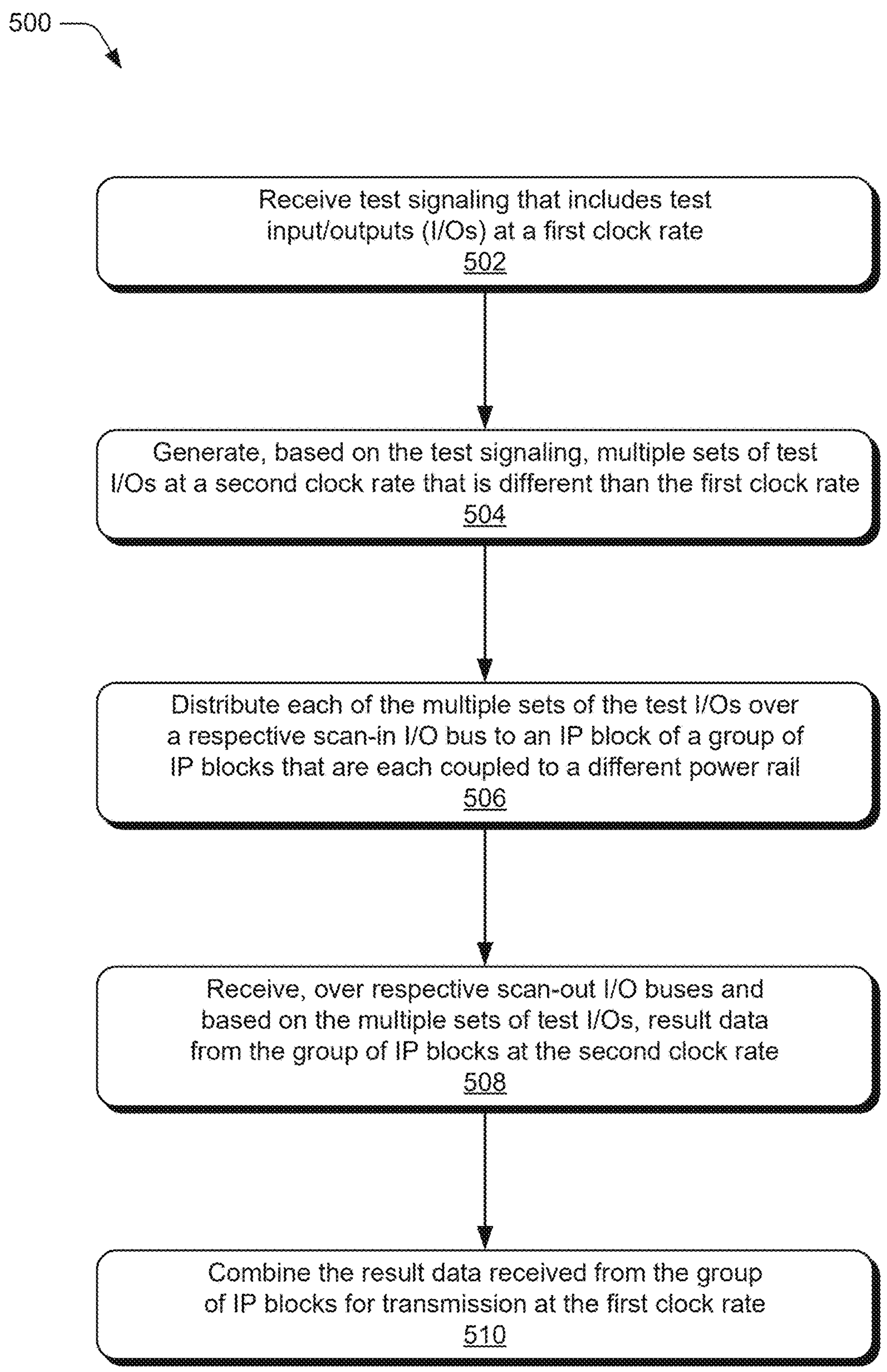
FIG. 5 illustrates an example method for testing multiple IP blocks with distributed test data in accordance with one or more aspects.

FIG. 5 illustrates an example method 500 for testing multiple IP blocks with distributed test data in accordance with one or more aspects. In aspects, operations of the method 500 are implemented by or with interleaved scan circuitry 110, block selection logic 112, scan-out combiner 114, scan I/O interface 118, and/or scan clock interface 120.

At 502, interleaved scan circuitry receives test signaling that includes test I/Os at a first clock rate. The test I/Os or testing signaling may be received by sampling the incoming data at a double data rate. For example, the scan I/O interface of an SoC may receive 40 I/Os (bits of test data) over a channel operating at 200 MHz DDR. The interleaved scan circuitry may also receive a clock signal for receiving or processing the test I/Os at the first clock rate (e.g., a 200 MHz DDR clock).

At 504, the interleaved scan circuitry generates, based on the test signaling, multiple sets of test I/Os at a second clock rate that is different than the first clock rate. In some cases, the second clock rate is lower than the first clock rate. For example, the interleaved scan circuitry can generate multiple sets of 40 I/Os at 100 MHz SDR based on 40 I/Os received at 200 MHz DDR. At 506, the interleaved scan circuitry distributes each of the multiple sets of the test I/Os over a respective scan-in bus to an IP block of a group of IP blocks. Each IP block of the group of IP blocks can be coupled to an independent power rail or a different power rail, such that any two of the IP blocks of the group draw power from different power rails thereby reducing power consumption during testing.

At 508, the interleaved scan circuitry receives, over respective scan-out I/O buses and based on the multiple sets of test I/Os, result data from the group of IP blocks. The interleaved scan circuitry can receive the result data over the scan-out I/O buses at the second clock rate. For example, a scan-out combiner can receive 40 result I/Os at 100 MHz over respective scan-out I/O buses from four IP blocks. At 510, the interleaved scan circuitry combines the result data received from the group of IP blocks for transmission at the first clock rate. For example, the scan-out combiner can combine data bits or I/Os received at a first data rate (e.g., 160 output I/Os at 100 MHz SDR) to provide the combined result data at a second data rate (e.g., 40 output I/Os at 200 MHz DDR).

Figure 6:
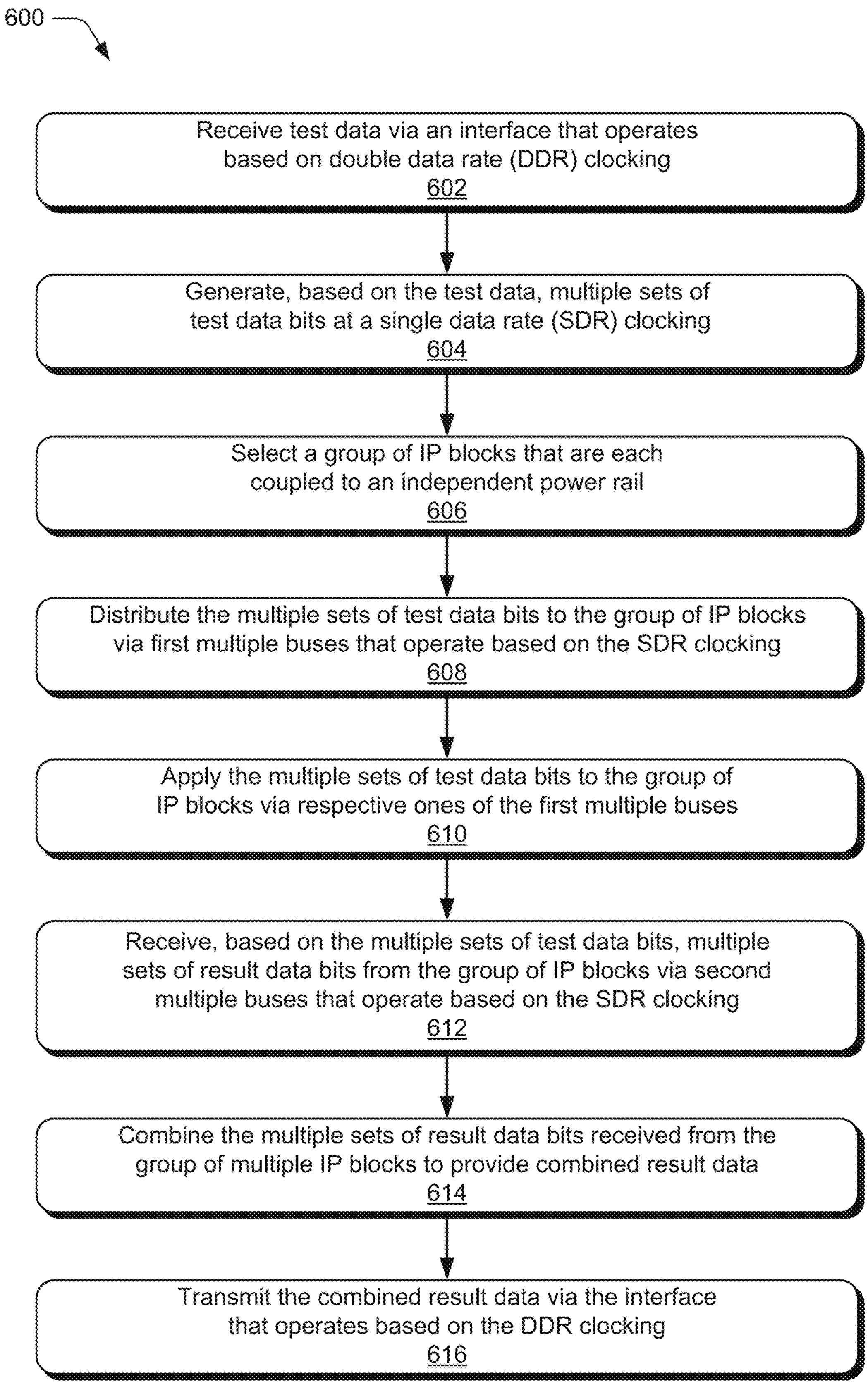
FIG. 6 illustrates an example method for applying test data to a selected group of IP blocks in accordance with one or more aspects.

FIG. 6 illustrates an example method 600 for applying test data to a selected group of IP blocks in accordance with one or more aspects. In aspects, operations of the method 600 are implemented by or with interleaved scan circuitry 110, block selection logic 112, scan-out combiner 114, scan I/O interface 118, and/or scan clock interface 120.

At 602, the interleaved scan circuitry receives test data via an interface that operates based on DDR clocking. The interface may include a scan I/O interface of a first bus-width by which bits of the test data are received or sampled based on the DDR clocking. For example, a scan I/O interface may receive 160 bits of data over a 40-bit wide bus during two clock cycles of DDR clocking. At 604, the interleaved scan circuitry generates, based on the test data, multiple sets of test data bits at a single data rate clocking. In some cases, the interleaved scan circuitry receives a DDR clock signal via a clock interface and generates, based on the DDR clock signal, an SDR clock signal for use in generating or communicating the multiple sets of test bits through test networks. In the context of the present example, a scan-in/scan-out distributor can generate or provide four unique sets of 40 bits of test data at SDR clocking (e.g., one SDR clock cycle) based on the 160 bits received at 200 MHZ DDR clocking (e.g., two DDR clock cycles).

At 606, the interleaved scan circuitry selects a group of IP blocks that are each coupled to or operate from an independent power rail. In some cases, the interleaved scan circuitry or a test controller selects the group of IP blocks from multiple groups of IP blocks. Each of the multiple groups of IP blocks may include respective IP blocks that are coupled to different power rails. Continuing the ongoing example, block selection logic may select a first group of four IP blocks (e.g., IP block 1 106-1, IP block 3 106-3, IP block 5 106-5) that are each on a different power rail. At 608, the interleaved scan circuitry distributes the multiple sets of test data bits to the group of IP blocks via first multiple buses that operate based on the SDR clocking.

At 610, the interleaved scan circuitry applies the multiple sets of test data bits to the group of IP blocks via respective ones of first multiple buses. In some cases, the first multiple buses comprise scan-in I/O buses that are each routed to one IP block of the group of IP blocks. The application of the multiple sets of test data bits to the group of IP blocks may include selectively activating gating logic coupled between the scan-in I/O buses and the group of IP blocks. In the context of the present example, block selection logic may selectively activate gating logic coupled between each of the scan networks and each IP block of the group of IP blocks to apply the test data bits.

At 612, the interleaved scan circuitry receives, based on the multiple sets of test data bits, multiple sets of result data bits from the group of IP blocks via second multiple buses that operate based on the SDR clocking. In some cases, the second multiple buses comprise scan-out I/O buses that are each routed from one IP block of the group of IP blocks to a scan-out combiner or other circuitry. Continuing the ongoing example, the scan-out combiner receives 40 bits of result data from each of the four IP blocks at 100 MHz SDR clocking. At 614, the interleaved scan circuitry or a scan-out combiner combines the multiple sets of result data bits received from the group of IP blocks to provide combined result data. In some cases, combining the multiple sets of result data bits includes using shift registers coupled to the scan-out I/O buses to provide combined result data. In the context of the present example, the scan-out combiner combines the four unique sets of 40 bits of result data to provide 160 bits of result data.

Alternatively or additionally, the scan-out combiner may clock out the 160 bits of result data at the first clock rate over a narrower scan-out I/O bus. For example, the scan-out combiner can transmit the 160 bits of result data to the scan I/O interface at 40 bits per clock cycle of a 200 MHZ DDR clock for transmission to the test system. At 616, the interleaved scan circuitry transmits the combined result data via the interface that operates based on the DDR clocking. In some cases, the scan I/O interface or pad block may receive the combined result data at the second clock rate (e.g., 100 MHz SDR). In such cases, the scan I/O interface or other circuitry of the pad block may re-clock or upclock the result data for transmission at the first clock rate. Concluding the present example, the scan I/O interface transmits the 160 bits of result data to the test system coupled to the pad block at 40 bits per clock cycle of a 200 MHZ DDR clock (e.g., 160 bits over two DDR clock cycles).

Figure 7:
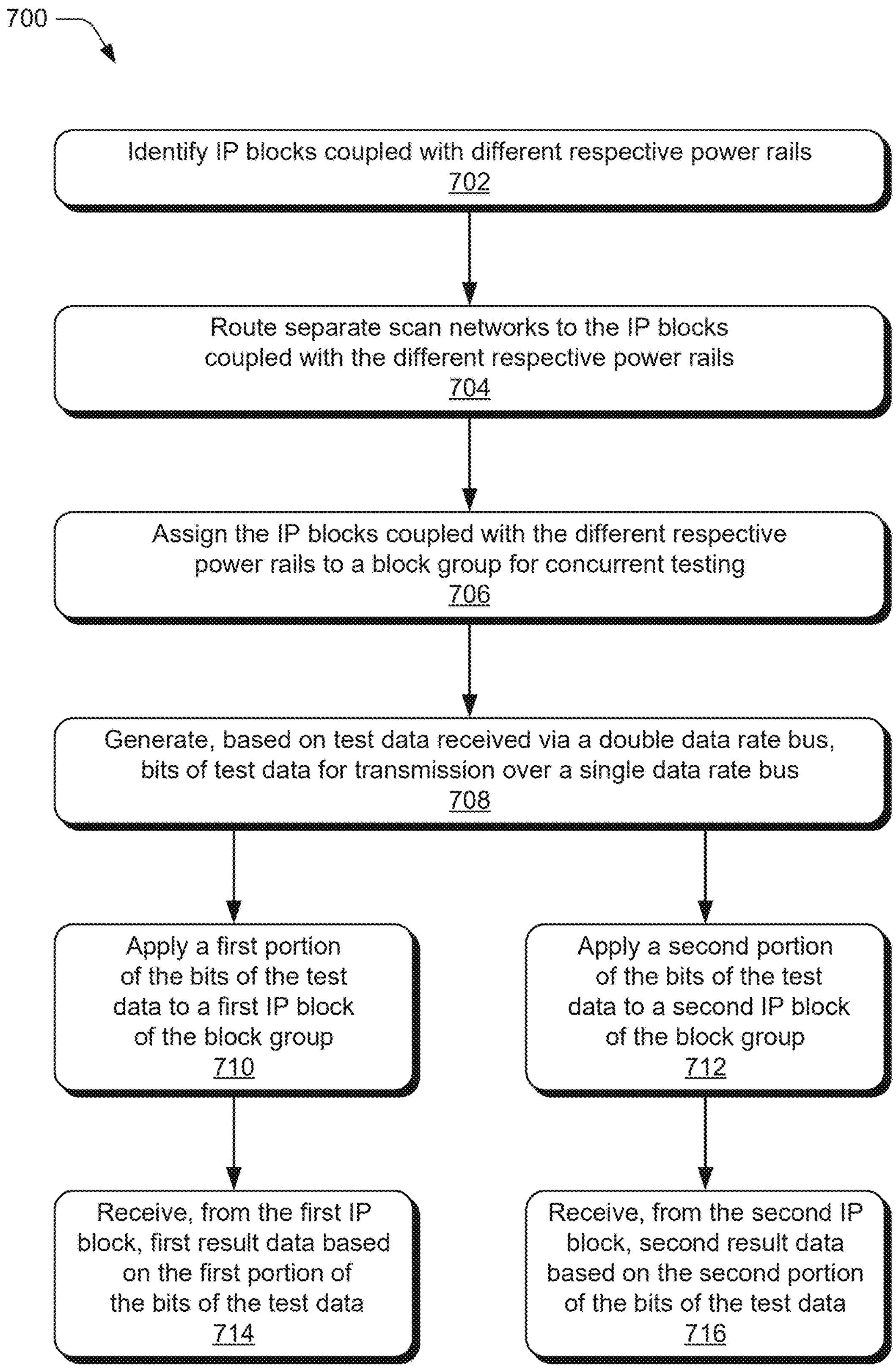
FIG. 7 illustrates an example method for implementing concurrent testing with an interleaved scan architecture in accordance with one or more aspects.

FIG. 7 illustrates an example method for implementing concurrent testing with an interleaved scan architecture in accordance with one or more aspects. In aspects, operations of the method 700 are implemented by or with interleaved scan circuitry 110, block selection logic 112, scan-out combiner 114, scan I/O interface 118, scan clock interface 120, and/or interleaved scan test module 206.

At 702, an interleaved scan test module identifies IP blocks coupled with different respective power rails. In some cases, the interleaved scan test module receives or is provided with net list data from a circuit design application that indicates which power rail each IP block of a system-on-chip is coupled with or operates from. At 704, the interleaved scan test module routes separate scan networks to the IP blocks coupled with the different respective power rails. For example, as part of a DIT process, the interleaved scan test module may route individual scan networks to multiple IP blocks that are each on a different power rail. At 706, the interleaved scan test module assigns the IP blocks coupled with the different respective power rails to a block group for concurrent testing. In some cases, the IP blocks are assigned to groups by routing respective scan networks of the IP blocks through a same set of gating logic, which may enable block selection logic to selectively activate the gating logic to concurrently apply test I/Os to each IP block in the group of IP blocks.

At 708, interleaved scan circuitry generates, based on test data received via a DDR bus, bits of test data for transmission at an SDR bus. For example, the interleaved scan circuitry can generate multiple sets of 40 I/Os at 100 MHZ SDR based on 40 I/Os received at 200 MHz DDR as described herein. At 710, the interleaved scan circuitry applies a first portion of the bits of the test data to a first IP block of the block group and, at 712, the interleaved scan circuitry applies a second portion of the bits of the test data to a second IP block of the block group. Thus, the interleaved scan circuitry concurrently applies portions of the test data to multiple IP blocks of the group of IP blocks. At 714, the interleaved scan circuitry receives, from the first IP block, first result data based on the first portion of the bits of the test data and, at 716, the interleaved scan circuitry receives, from the second IP block, second result data based on the second portion of the bits of the test data. In other words, the interleaved scan circuitry concurrently receives portions of the result data from the multiple IP blocks of the group of IP blocks. From operation 708, the method 700 may implement corresponding operations of the method 500 or the method 600 to combine the result data and transmit the data to the test apparatus via a scan I/O interface.

Example System-on-Chip

Figure 8:
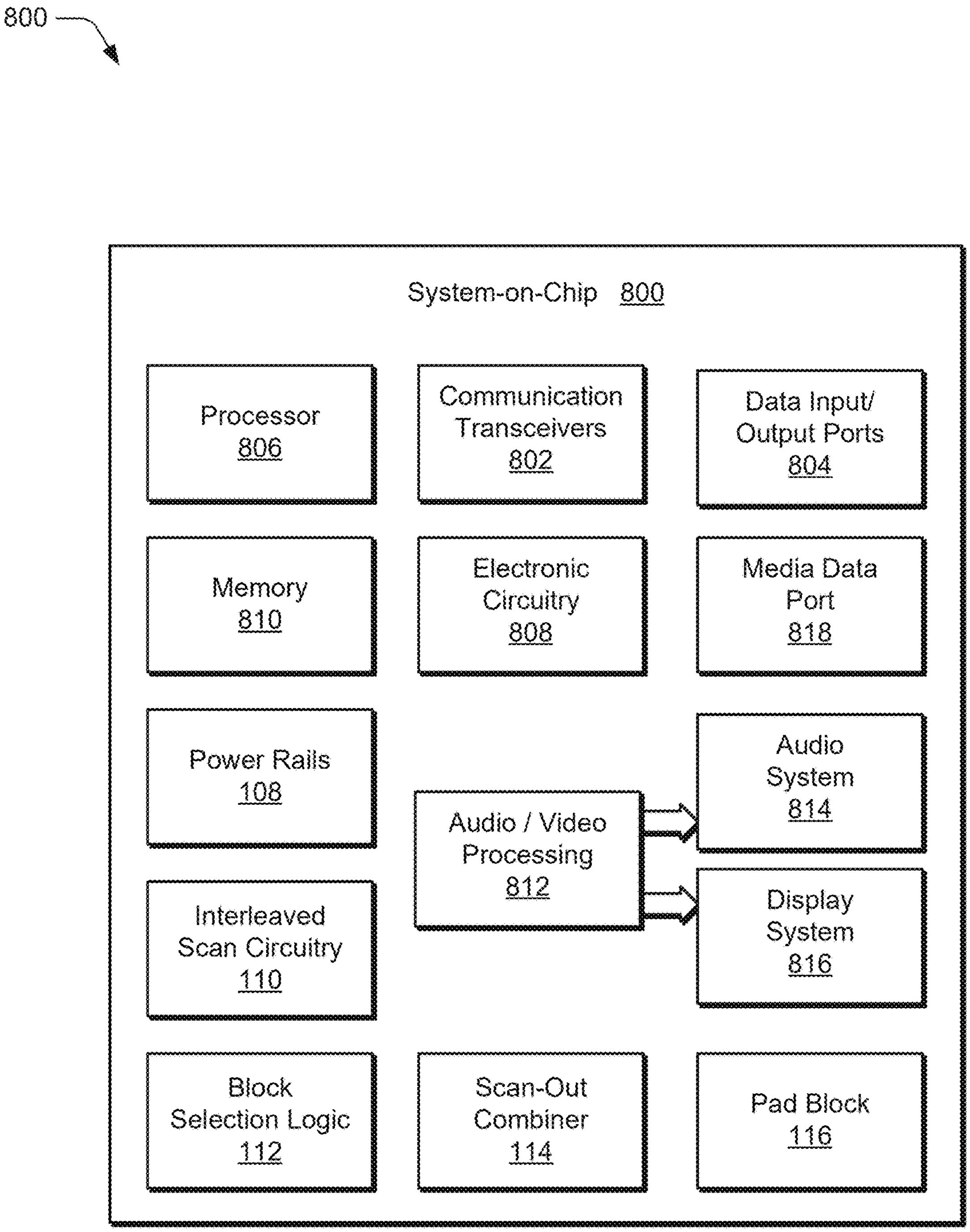
FIG. 8 illustrates an example System-on-Chip in which aspects of an interleaved scan architecture for concurrent testing may be implemented.

FIG. 8 illustrates various components of an example System-on-Chip 800 (SoC 800) in which aspects of an interleaved scan architecture for concurrent testing may be implemented in accordance with one or more aspects. The SoC 800 may be implemented as any single or multiple of a fixed, mobile, stand-alone, or embedded device; in any form of a consumer, computer, portable, user, server, communication, phone, navigation, gaming, audio, camera, messaging, media playback, and/or other type of SoC 800, which may include interleaved scan circuitry 110 and associated components. One or more of the illustrated components may be realized as discrete components or as integrated components on at least one integrated circuit of the SoC 800. In the context of FIG. 8, the following components 802 through 818 may be implemented as or represent IP blocks or functional blocks of the SoC 800. Generally, the various components of the SoC 800 are coupled via an interconnect and/or one or more fabrics that support communication between the components in accordance with one or more aspects of function call authorization.

The SoC 800 can include one or more communication transceivers 802 that enable wired and/or wireless communication of device data, such as received data, transmitted data, or other information identified above. Example communication transceivers 802 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (WiFi™) standards, wireless wide area network (WAN) (WWAN) radios (e.g., those that are Third Generation Partnership Project compliant (3GPP-compliant)) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The SoC 800 may also include one or more data input ports 804 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 804 may include USB ports, coaxial cable ports, fiber optic ports for optical fiber interconnects or cabling, and other serial or parallel connectors (including internal connectors) for flash memory, DVDs, CDs, and the like. These data input ports 804 may be used to couple the SoC to components, peripherals, or accessories such as keyboards, microphones, cameras, or other sensors.

The SoC 800 of this example includes at least one processor 806 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. The processor 806 may be implemented as an application processor, embedded controller, microcontroller, security processor, artificial intelligence (AI) accelerator, and the like. Generally, a processor or processing system may be implemented at least partially in hardware, which can include components of an integrated circuit or on chip system, a digital signal processor (DSP), an application-specific integrated circuit (ASIC), a field programmable gate array (FPGA), a complex programmable logic device (CPLD), and other implementations in silicon and/or other materials.

Alternatively or additionally, the SoC 800 can be implemented with any one or combination of electronic circuitry, which may include software, hardware, firmware, or fixed logic circuitry that is implemented in connection with processing and control circuits, which are generally indicated at 808 (as electronic circuitry 808). This electronic circuitry 808 can implement executable or hardware-based modules (not shown in FIG. 8), such as through processing/computer-executable instructions stored on computer-readable media, through logic circuitry and/or hardware (e.g., such as an FPGA), and so forth.

The SoC 800 also includes memory 810 and/or other memory devices that enable data storage, examples of which include random access memory (RAM), non-volatile memory (e.g., read-only memory (ROM), flash memory, erasable programable read-only memory (EPROM), and electrically-erasable programable read-only memory (EEPROM)), and a disk storage device. Thus, the memory devices of the SoC 800 can be distributed across different logical storage levels of a system as well as at different physical components. The memory devices provide data storage mechanisms to store the device data, other types of code and/or data, and various device applications (e.g., software applications or programs). For example, an operating system can be maintained as software instructions within the memory device, such as memory 810, and executed by the processor 806.

As shown in FIG. 8, the SoC 800 can include power rails 108, interleaved scan circuitry 110, block selection logic 112, scan-out combiner 114, and a pad block 116, which may be implemented as described with reference to FIGS. 1-7. In aspects, the interleaved scan circuitry 110 receives test signaling that includes test I/Os at a first clock rate and generates, based on the test signaling, multiple sets of test I/Os at a second clock rate that is different from the first clock rate. The interleaved scan circuitry 110 then distributes each of the multiple sets of the test I/Os over a respective scan-in I/O bus to one of the IP blocks of a group of multiple IP blocks and receives, over respective scan-out I/O buses and based on the multiple sets of test I/Os, multiple sets of result data from the group of multiple IP blocks. In some aspects, the second clock rate is lower than the first clock rate, which enables relaxing of timing constraints during testing and avoids usage of costly test-specific timing buffers (design area left unused in mission mode). As such, the concurrent testing enabled with the interleaved scan circuitry 110 can reduce chip test time and reduce silicon complexity by avoiding the need for test-specific timing or power circuitry.

In some implementations, the SoC 800 also includes an audio and/or video processing system 812 that processes audio data and/or passes through the audio and video data to an audio system 814 and/or to a display system 816 (e.g., a video buffer or a screen of a smartphone or camera). The audio system 814 and/or the display system 816 may include any devices that process, display, and/or otherwise render audio, video, display, and/or image data. Display data and audio signals can be communicated to an audio component and/or to a display component via an RF (radio frequency) link, S video link, HDMI (high-definition multimedia interface), composite video link, component video link, DVI (digital video interface), analog audio connection, video bus, or other similar communication link, such as a media data port 818. In some implementations, the audio system 814 and/or the display system 816 are external or separate components of the SoC 800. Alternatively, the display system 816, for example, can be an integrated component of the example SoC 800, such as part of an integrated touch interface.

CONCLUSION

Although aspects of the described apparatuses and techniques for an interleaved scan architecture for concurrent testing have been described in language specific to features and/or methods, the subject of the appended claims is, as recited by any of the previous examples, not necessarily limited to the specific features or methods described. Rather, the specific features and methods are disclosed as example implementations of an interleaved scan architecture for concurrent testing, and other equivalent features and methods are intended to be within the scope of the appended claims. Further, various aspects of an interleaved scan architecture for concurrent testing are described, and it is to be appreciated that each described aspect can be implemented independently or in connection with one or more other described aspects.

What is claimed is:

1. A system-on-chip comprising:

power rails configured to provide power to components of the system-on-chip;

intellectual property (IP) blocks;

block selection logic configured to select, from the IP blocks, a group of multiple IP blocks that are each coupled to a different one of the power rails; and interleave scan circuitry configured to:

receive test signaling comprising test input/outputs (I/Os) at a first clock rate;

generate, based on the test signaling, multiple sets of test I/Os at a second clock rate that is different from the first clock rate;

distribute each of the multiple sets of the test I/Os over a respective scan-in I/O bus to one of the IP blocks of the group of multiple IP blocks; and receive, over respective scan-out I/O buses and based on the multiple sets of test I/Os, multiple sets of result data from the group of multiple IP blocks.

2. The system-on-chip as recited in claim 1, further comprising an I/O interface configured to receive the test signaling at the first clock rate by sampling the test signaling at double data rate.

3. The system-on-chip as recited in claim 1, wherein the interleave scan circuitry is further configured to distribute the multiple sets of the test I/Os over the respective scan-in buses by transmitting the multiple sets of the I/Os using a single data rate scan clock.

4. The system-on-chip as recited in claim 3, further comprising a scan clock interface configured to receive a double data rate clock, and wherein the interleave scan circuitry is further configured to generate the single data rate clock based on the double data rate clock.

5. The system-on-chip as recited in claim 2, wherein the interleave scan circuitry is further configured to:

receive the multiple sets of result data via the scan-out buses at the second clock rate;

generate, based on the multiple sets of result data, combined result data for the group of the multiple IP blocks; and transmit, via the I/O interface, the combined result data at the first clock rate.

6. The system-on-chip as recited in claim 5, wherein:

interleave scan circuitry is configured to receive the multiple sets of result data by sampling the scan-out buses at single data rate; and the I/O interface is configured to transmit the data at the first clock rate at double data rate.

7. The system-on-chip as recited in claim 1, wherein the second clock rate is lower than the first clock rate.

8. The system-on-chip as recited in claim 1, wherein the multiple sets of the test I/Os are concurrently distributed to the group of multiple IP blocks via the respective scan-in I/O buses.

9. The system-on-chip as recited in claim 1, wherein each of the multiple sets of the test I/Os is distributed to only one IP block of the group of multiple IP blocks.

10. A method for testing intellectual property (IP) blocks of a system-on-chip, the method comprising:

receiving test data via an interface that operates based on double data rate (DDR) clocking;

generating, based on the test data, multiple sets of test data bits at single data rate (SDR) clocking;

selecting a group of IP blocks that are each coupled to an independent power rail;

distributing each of the multiple sets of test data bits to an IP block of the group of IP blocks via a respective one of first multiple buses that operate based on the SDR clocking;

receiving, based on the multiple sets of test data bits, multiple sets of result data bits from the group of IP blocks via second multiple buses that operate based on the SDR clocking;

combining the multiple sets of result data bits received from the group of IP blocks to provide combined result data; and transmitting the combined result data via the interface that operates based on the DDR clocking.

11. The method as recited in claim 10, further comprising:

receiving a DDR clock signal via a clock interface; and generating, based on the DDR clock signal, an SDR clock signal by which the first multiple buses or second multiple buses operate.

12. The method as recited in claim 10, wherein the selecting of the group of IP blocks comprises selecting the group of IP blocks from multiple groups of IP blocks, each of the multiple groups of IP blocks comprising respective IP blocks that are each coupled to different power rails.

13. The method as recited in claim 10, further comprising applying, based on the selection of the group of IP blocks, the multiple sets of test data bits to the group of IP blocks via respective ones of the first multiple buses.

14. The method of claim 13, wherein:

the first multiple buses comprise scan-in input/output (I/O) buses that are each routed to one IP block of the group of IP blocks; and applying the multiple sets of test data bits to the group of IP blocks comprises selectively activating gating logic coupled between the scan-in I/O buses and the group of IP blocks.

15. The method as recited in claim 10, wherein:

the second multiple buses comprise scan-out input/output (I/O) buses that are each routed from one IP block of the group of IP blocks; and combining the multiple sets of result data bits comprises using shift registers coupled to the scan-out I/O buses to provide combined result data.

16. An integrated circuit comprising:

power rails configured to provide power to circuitry of the integrated circuit;

functional blocks of the circuitry configured to enable respective functions of the integrated circuit, each of the functional blocks coupled to a different one of the power rails; and interleave scan circuitry configured to:

receive, via a test data interface, test signaling comprising test inputs at a first clock rate;

generate, based on the test signaling, multiple sets of test inputs at a second clock rate that is different from the first clock rate;

distribute each of the multiple sets of the test inputs over a respective scan-in network to one of the functional blocks of the integrated circuit; and receive, over respective scan-out networks and based on the multiple sets of test inputs, multiple sets of test outputs from the functional blocks of the integrated circuit.

17. The integrated circuit as recited in claim 16, wherein the functional blocks comprise a subset of functional blocks of the integrated circuit and the integrated circuit further comprises block selection logic configured to:

select, from the functional blocks of the integrated circuit, the subset of functional blocks in which each of the functional blocks are each coupled to a different one of the power rails.

18. The integrated circuit as recited in claim 16, wherein the test data interface configured to receive the test signaling at the first clock rate by sampling the test signaling at double data rate.

19. The integrated circuit as recited in claim 16, wherein the interleave scan circuitry is further configured to distribute the multiple sets of the test inputs over the respective scan-in networks by transmitting the multiple sets of the test inputs using a single data rate scan clock.

20. The integrated circuit as recited in claim 16, wherein the interleave scan circuitry is further configured to:

receive the multiple sets of test outputs via the scan-out networks at the second clock rate;

generate, based on the multiple sets of test outputs, combined test outputs for the functional blocks of the integrated circuit; and transmit, via the test data interface, the combined test outputs at the first clock rate.

* * * * *